United States Patent [19]
Cain et al.

[11] Patent Number: 5,144,625
[45] Date of Patent: Sep. 1, 1992

[54] DIGITAL SUBSCRIBER LINE TERMINATION WITH SIGNALLING

[75] Inventors: Roger W. Cain; Dennis B. McMahan, both of Huntsville, Ala.

[73] Assignee: Adtran, Huntsville, Ala.

[21] Appl. No.: 634,435

[22] Filed: Dec. 27, 1990

[51] Int. Cl.$^5$ .............................................. H04J 3/12
[52] U.S. Cl. .................................. 370/110.1; 370/112
[58] Field of Search ...................... 370/110.1, 112, 68.1, 370/76, 105.1, 105.4; 379/65, 93, 353

[56] References Cited

U.S. PATENT DOCUMENTS

| | | | |
|---|---|---|---|
| 3,851,110 | 11/1974 | Kelly | 179/18 |
| 3,909,540 | 9/1975 | Maryscuk | 179/15 |
| 3,970,799 | 7/1976 | Colton et al. | 370/110.1 |
| 4,227,075 | 10/1980 | Holland | 370/4 |
| 4,476,559 | 10/1984 | Brolin et al. | 370/110.1 |
| 4,651,319 | 3/1987 | Bowlds | 370/112 |
| 4,689,790 | 8/1987 | Lacroix et al. | 370/110.1 |
| 4,745,601 | 5/1988 | Diaz et al. | 370/110.1 |
| 4,799,217 | 1/1989 | Fang | 370/68.1 |

OTHER PUBLICATIONS

Page 1-7, "Digital Signal Format" N. E. Snow & N. Knapp, Jr., *Bell System Technical Journal*, Digital Data System: System Overview, May-Jun., 1975, 811-832.

C. R. Crue, et al., *Bell System Technical Journal*, "D4 Digital Channel Bank Family: The Channel Bank," Nov., 1982, 2611-2663.

*Technical Advisory of Bell Communications Research*, "Digital Data System—Requirements for the Office Channel Unit," Dec., 1984.

*Primary Examiner*—Douglas W. Olms
*Assistant Examiner*—H. Kizou
*Attorney, Agent, or Firm*—Dann, Dorfman, Herrell and Skillman

[57] ABSTRACT

A method and system for interfacing a transmission facility with a digital subscriber line to enable transmission of digital voice communication and associated digital signalling are provided. A digital signal from the digital subscriber line is demultiplexed into a digital communication signal and a digital input control signal having a first sequence providing standard framing pattern, a second sequence providing signalling identification, and a third sequence providing signalling information. A monitor monitors the sequence of the input control signal and produces a signalling identification detect signal when the second sequence is detected and signalling enablement output when the third sequence is detected. The communication signal from the digital subscriber line is selectively multiplexed with the signalling information from the input control signal. The signalling information is output to the transmission facility when the signalling-enablement output is produced by the monitor. A digital transmission signal from the transmission facility is demultiplexed into a communication signal and signalling signal. A generator generates a digital output signal in a first sequence to provide standard framing pattern, in a second sequence to provide signalling identification whenever the signalling identification detect signal is produced, and in a third sequence to include the signalling information from the transmission facility when the signalling-enablement output is produced. The communication signal from the transmission facility is multiplexed with the digital output signal from the generator into a digital signal for output onto the digital subscriber line.

68 Claims, 4 Drawing Sheets

FIG. 5
TRANSMITTER

FIG.7
RECEIVER

DIGITAL SUBSCRIBER LINE TERMINATION WITH SIGNALLING

FIELD OF THE INVENTION

The present invention relates to digital transmission systems and, more particularly, to a system and method for terminating a digital subscriber line for digital voice communication transmissions and associated digital signalling.

BACKGROUND OF THE INVENTION

Telephone operating companies offer many different communication services to business and private customers. Voice services may be offered through the public switched network as well as through private networks. Generally, the private networks are used by large corporations or government agencies to provide both voice and data communications separate from the public switched network.

Analog voice and data service is offered through the private networks to an individual customer by a communications circuit connected between the customer's telephone set and the central office equipment of the telephone operating company. Analog voice and data signals are transmitted between the customer and the central office over the circuit. In order to provide voice communication over the analog service, signalling is required to indicate that service is desired (off-hook) or that service is available (dial tone) and to send dial pulses or tones to indicate busy or ringing as the call is processed.

A persistent problem with using analog service is that analog signals are subject to various types of electrical interference and disturbances which can degrade the service. In large part, however, many of the problems inherent in analog service may be overcome by the use of digital techniques. One such technique is the conversion of the analog signals at the customer site to a digital format suitable for transmission to the central office equipment of the telephone company. The analog signals must be converted to the requisite digital format by a network device installed at the customer location. Once the analog signals are converted to digital format by the network device, the digital data is then sent from the customer to the telephone network in digital form. Since the transmitted digital data is essentially immune to most of the degradation of analog signals, an improved service is realized.

Since conventional voice frequency (VF) subscriber lines are subject to the various problems associated with analog transmission, improvements in service are possible if digital subscriber lines are used to deliver voice frequency services. If analog-to-digital conversion of voice is performed at the customer site by a network device such as an Analog Data Station Terminal, conventional digital subscriber lines can be utilized. A resulting problem, however, is that the transmission of signalling states such as off-hook, dial-tone, and busy-signal must then be accommodated in the digital subscriber line local loop format. This creates a problem in effecting voice communication over the digital subscriber line because the conventional methods of signalling are no longer available. In accordance with the present invention, a method and system are provided to effect reliable signalling transmission over a digital subscriber line.

SUMMARY OF THE INVENTION

In accordance with the present invention, a system for interfacing a transmission facility with a digital subscriber line to effect voice communications and associated signalling is provided. The system includes a subscriber line demultiplexer for demultiplexing a digital signal from the digital subscriber line into a digital communication signal containing communication information, such as voice information, from the subscriber line and a digital input control signal containing control information from the subscriber line. The input control signal selectively operates in one of several different digital sequences. The input control signal may operate in a first digital sequence for, selected operation in a non-signalling mode of operation such as to provide a standard framing pattern. The input control signal may also operate in a second digital sequence, such as an inverted standard framing pattern, to provide signalling identification in order to indicate the capability for digital signalling transmission. Finally, the input control signal may operate in a third digital sequence which incorporates digital signalling bits from the digital subscriber line in order to provide actual signalling information from the digital subscriber line.

A monitor functions to monitor the sequence of the digital input control signal from the subscriber line demultiplexer in order to detect the particular digital sequence of the digital input control signal. The monitor selectively produces a signalling identification detect signal when the second digital sequence of the input control signal is detected. Whenever the third digital sequence of the input control signal is detected, the monitor functions to produce a signalling-enablement output in the form of a signalling-enablement output signal. The monitor also outputs the signalling information from the digital subscriber line by outputting the digital signalling bits from the third digital sequence of the input control signal.

A transmission facility multiplexer is employed for selectively multiplexing the communication information from the digital subscriber line with the signalling information from the input control signal into a selected format for output to the transmission facility. The transmission facility multiplexer is responsive to the signalling-enablement output from the monitor to enable the output of the signalling information from the input control signal to the transmission facility. The transmission facility multiplexer outputs the signalling information to the transmission facility only when the signalling-enablement output is produced by the monitor. In the absence of the signalling-enablement output, only the communication information is output by the multiplexer to the transmission facility.

A transmission facility demultiplexer is employed for demultiplexing a digital transmission signal from the transmission facility. The transmission facility demultiplexer functions to demultiplex the digital transmission signal into a communication signal containing communication information from the transmission facility and a signalling signal containing signalling information from the transmission facility.

A generator is provided for generating a digital output control signal. The generator is responsive to the signalling-enablement output and the signalling identification detect signal from the monitor. The generator selectively produces the digital output control signal in one of several different digital sequences to provide different types of control information to the digital subscriber line.

The generator produces the digital output control signal in a first digital sequence for selected operation in a non-signalling mode of operation such as to provide standard framing pattern. The digital output control signal is then produced in a second digital sequence, such as inverted standard framing pattern, for providing signalling identification whenever the signalling identification detect signal is produced by the monitor. The generator produces the output control signal in the second sequence in order to provide an acknowledgment of signalling capability back to the digital subscriber line. The generator also produces the digital output control signal in a third digital sequence which incorporates signalling bits of information from the transmission facility when the signalling-enablement output is produced by the monitor. The generation of the output control signal in the third sequence enables signalling information from the transmission facility to be transmitted to the digital subscriber line.

A subscriber line multiplexer is employed for multiplexing the communication information from the transmission facility and the digital output control signal from the generator. Such signals are multiplexed into a digital signal having a selected digital transmission format for output onto the digital subscriber line.

In accordance with the present invention, a method is also provided for interfacing a transmission facility with a digital subscriber line to effect digital voice communications and associated signalling. In accordance with such method, a digital signal from the digital subscriber line is demultiplexed into a digital communication signal containing voice communication information from the subscriber line and a digital input control signal containing control information from the subscriber line. The input control signal selectively operates in one of several different digital sequences. More specifically, the input control signal may selectively operate in a first digital sequence of selected operation to provide, for example, standard framing pattern. The input control signal may also operate in a second digital sequence, such as an inverted standard framing pattern, to provide signalling identification for the purpose of indicating signalling capability. Finally, the input control signal may selectively operate in a third digital sequence containing signalling bits of information from the digital subscriber line in order to provide signalling information from the digital subscriber line.

The digital input control signal is monitored to detect the sequence of operation of the digital input control signal. A signalling identification detect signal is produced whenever the second digital sequence of the input control signal is detected. A signalling-enablement output in the form of a signalling-enablement output signal is produced whenever the third digital sequence of the input control signal is detected.

The communication information from the digital subscriber line is multiplexed with the signalling information from the input control signal in a selected format for output to the transmission facility. The output of the signalling information from the input control signal to the transmission facility is enabled only when the signalling enablement output is produced.

A digital transmission signal from the transmission facility is transmitted in a selected format containing communication information and signalling information. The digital transmission signal from the transmission facility is demultiplexed into a communication signal containing the communication information from the transmission facility and a signalling signal containing the signalling information from the transmission facility.

A digital output control signal is produced in a first digital sequence, such as standard framing pattern, for selected operation. Whenever the signalling identification detect signal is produced, the digital output control signal is produced in a second digital sequence, such as inverted standard framing pattern, for providing signalling identification back to the digital subscriber line. Whenever the signalling-enablement output is produced, the digital output control signal is produced in a third digital sequence which includes signalling bits of information from the transmission facility.

The communication information from the transmission facility is multiplexed with the digital output control signal into a digital signal having a selected digital transmission format for output onto the digital subscriber line. Digital voice communication and associated signalling is thereby effected.

BRIEF DESCRIPTION OF THE DRAWINGS

The foregoing summary, as well as the following detailed description of the preferred embodiments of the present invention, will be better understood when read,, in conjunction with the accompanying drawings, in which.

DETAILED DESCRIPTION OF THE PREFERRED EMBODIMENTS

Figure 1:
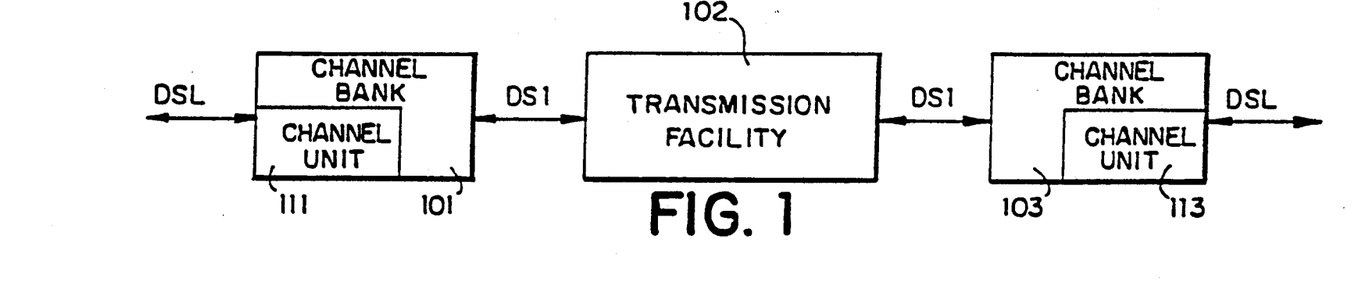
FIG. 1 is a simplified block diagram of a digital transmission arrangement in which the method and system of the present invention are employed.

Referring to FIG. 1, a digital transmission arrangement is depicted in which channel units 111 and 113 are employed for interfacing a transmission facility 102, such as a pulse code modulation (PCM) voice transmission facility using robbed-bit signalling, with digital subscriber lines DSL. As specifically shown in FIG. 1, a digital subscriber line DSL interconnects a customer location with the channel unit 111 in channel bank 101. The digital subscriber line DSL transmits a digital signal in a selected digital format such as a DSL format employing the standard 56 kbit/s signal with secondary channel. The channel unit 111 cooperates with a DS1 multiplexer 406 to convert the DSL signal format to a DS1 transmission signal format for output to the transmission facility 102. Channel unit 111 also cooperates with a DS1 demultiplexer 601 to convert the DS1 format signal from the transmission facility 102 into the desired DSL format for output onto the digital subscriber line DSL.

Channel unit 113 in channel bank 103 receives the DS1 formatted signal from the transmission facility 102. The DS1 signal format is converted into the standard DSL format for transmission over the digital subscriber line DSL to a respective customer. In order to effect the digital communications, each of the channel units 111 and 113 includes transmission circuitry 400 which cooperates with a DS1 multiplexer 406 for converting a DSL signal to a DS1 signal for output to the transmission facility 102 and receiver circuitry 600 which cooperates with a DS1 demultiplexer 601 for converting a DS1 signal to a DSL signal for output onto the digital subscriber line DSL.

Figure 2:
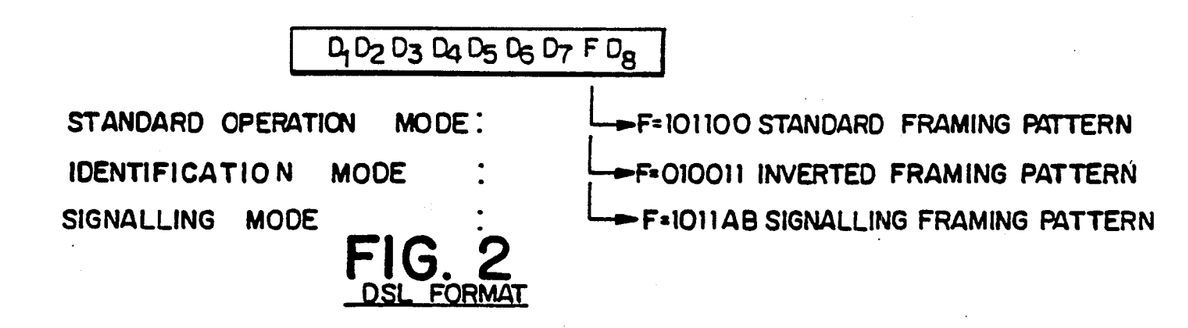
FIG. 2 depicts a digital subscriber line (DSL) signal format which includes an 8-bit communication channel D, typically for pulse code modulation (PCM) voice samples, and a framing pattern F having three modes of operation.

As shown in FIG. 2, digital signals are transmitted on the digital subscriber line DSL in a selected digital transmission format which includes voice communication information and control information. As specifically shown, the DSL format includes an 8-bit communication channel D, typically for pulse code modulation voice data bits $D_1$-$D_8$ (PCM samples), and a framing bit F for providing a framing pattern with three specific modes of operation. The 8-bit voice frequency is sampled at an 8 kHz rate with $D_1$ as the most significant bit and $D_8$ as the least significant bit. In a standard mode of operation, the framing pattern F is in a first digital sequence (F=101100) which conforms to the standard framing pattern for the standard 56 kbit/s signal with secondary channel. In order to provide indication of signalling capability, the framing pattern can be changed to a second digital sequence (F-010011) for providing signalling identification. The second sequence consists of the digital complement of the standard framing pattern. As such, the second sequence is an inverted standard framing pattern (F=010011). In order to effect the actual transmission of digital signalling information, such as on-hook, off-hook, dial-pulse, and busy signal, the framing pattern is produced in a third mode of operation. In the signalling mode of operation, the framing pattern F is changed to a third digital sequence (F=1011AB) in which the standard framing pattern is altered to include signalling bits A and B as the last two bits of the framing pattern. The DSL signal is typically transmitted at the 72 kbit/s rate over the digital subscriber line DSL.

Figure 3:
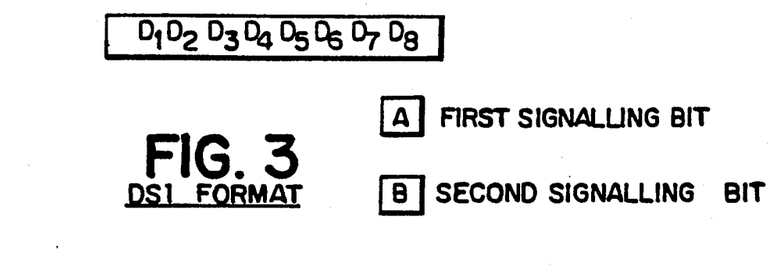
FIG. 3 depicts a segmented DS1 signal format for communication of PCM voice data together with signalling bits A and B.

Referring to FIG. 3, signals are transmitted to and from the transmission facility in a selected digital transmission format including voice communication information represented by voice bits $D_1$-$D_8$ and signalling information represented by signalling bits A and B. The 8-bit voice frequency is sampled at a 8 kHz rate with $D_1$ as the most significant bit and $D_8$ as the least significant bit. The DS1 signal is transmitted at the rate of 1.544 Mbit/s.

As specifically shown in FIG. 3, the DS1 format includes an 8-bit communication channel D and first and second signalling bits A and B. The A and B signalling bits may be packaged with the 8-bit voice communication channel in various ways. For example, a $D_3$/$D_4$ mode 3 format may be employed. The $D_3$/$D_4$ mode 3 bit stream is organized into superframes which each consist of twelve frames. Each frame of the superframe contains one synchronizing bit so that a receiving terminal can properly decode, demultiplex, and distribute the incoming bit streams. Accordingly, each superframe contains twelve synchronizing bits which form a twelve-bit sequence for providing framing pattern. The framing pattern is used for frame synchronization and to properly mark frames six and twelve which contain the signalling bits when voice transmission is effected. Each frame consists of twenty-four 8-bit channel words plus the framing bit. For voice transmissions, signalling must be transmitted with the channel voice samples. This may be effected by time sharing the least significant bit $B_8$ of channel words in selected frames between voice and signalling. For example, the $B_8$ bit of each voice channel will carry voice sample information for frames 1 through 5 and frames 7 through 11 and signalling information in frames 6 and 12.

Figure 4:
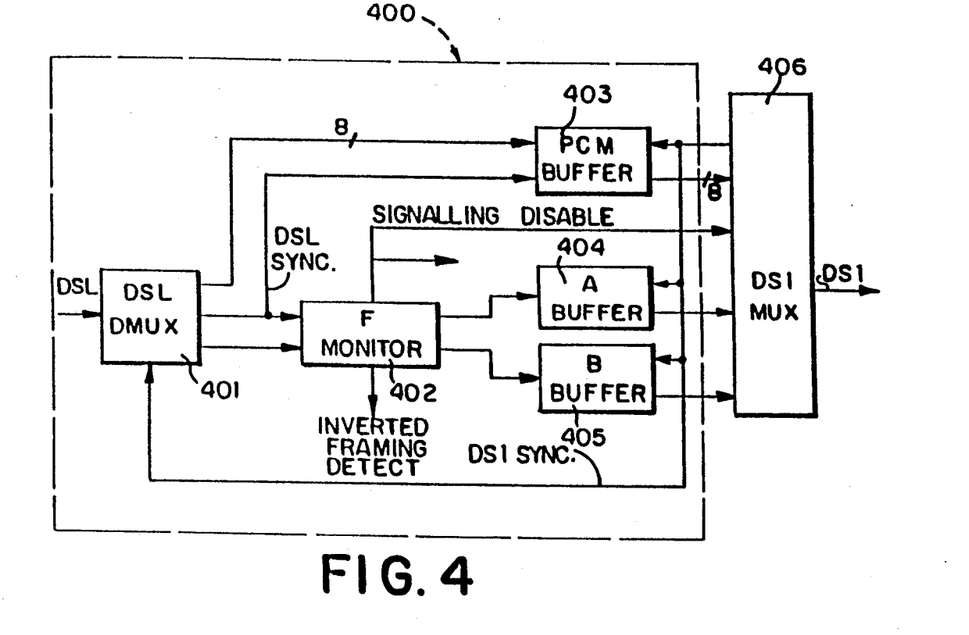
FIG. 4 is a block diagram of transmitter circuitry of an office channel unit for use with a DS1 multiplexer for converting a DSL signal format into a DS1 signal format.

Referring to FIG. 4, the transmitter circuitry 400 for use in channel units 111 and 113 is depicted. The transmitter circuitry 400 operates in association with DS1 multiplexer 406 to convert the DSL format signal from the digital subscriber line DSL to the DS1 format signal for use over T-carrier or other digital transmission facilities.

The transmitter circuitry 400 includes a digital subscriber line demultiplexer DSL DMUX 401 which functions to demultiplex the digital transmission signal on the DSL line into a digital communication signal containing communication information from the DSL line and a digital input control signal containing the control information from the DSL line. More specifically, the demultiplexer 401 demultiplexes the DSL formatted signal from the DSL line into a communication signal which contains the 8-bit communication channel information D of PCM voice sample and the input control signal in the form of the framing pattern F.

DSL DMUX 401 also generates a DSL SYNC signal which is derived from the incoming DSL framing bit and a DS1 SYNC signal which is received from transmission facility multiplexer DS1 MUX 406. The DSL SYNC signal is produced in synchronization with the DS1 SYNC signal. The DSL DMUX 401 includes the conventional framing, timing recovery, and other appropriate circuitry for interfacing with the digital subscriber line DSL.

The 8-bit communication channel information D from DSL DMUX 401 is supplied in parallel to a communication information buffer 403 which is connected between the DSL DMUX 401 and the DS1 MUX 406. The communication information buffer 403 functions as a PCM buffer to store the PCM communication channel information D and to provide such communication information to the DS1 MUX 406. The framing pattern information F is supplied one bit at a time as an input control signal from DSL DMUX 401 to F monitor 402 which functions to monitor the sequence of the framing pattern F. The DSL SYNC signal is supplied at an 8 kHz rate to the PCM buffer 403 and the F monitor 402.

In more specific operation, the F monitor 402 monitors the sequence of the bits in the framing pattern F to detect the particular sequence of the input control signal. The F monitor 402 thereby detects whether the sequence of the input control signal is the standard framing pattern (F=101100) to indicate a standard mode of operation, the inverted standard framing pattern (F=010011) to provide indication of signalling capability, or the signalling framing pattern (F=1011AB) to provide the signalling mode of operation.

When the standard framing pattern (F=101100) is received by the F monitor 402, a SIGNALLING DISABLE signal is output from the F monitor 402. The SIGNALLING DISABLE signal is supplied from the F monitor 402 to the DS1 MUX 406 to inhibit the DS1 MUX 406 from transmitting signalling bits A and B from the signalling framing pattern of the input control signal to the transmission facility 102. The SIGNALLING DISABLE signal is also used to prevent the receiver circuitry 600 of the office channel unit from transmitting signalling information back to the customer on the DSL line.

When the inverted framing pattern (F=010011) is detected by the F monitor 402, a signalling identification detect signal is produced by the F monitor 402. For this purpose, the F monitor 402 produces an INVERTED FRAMING DETECT signal. The INVERTED FRAMING DETECT signal serves to enable the receiver circuitry 600 of the channel unit to send inverted framing pattern back to the customer on the DSL line.

When the inverted framing pattern (F=010011) is no longer received at the F monitor 402, the INVERTED FRAMING DETECT signal is cleared to permit the F monitor to then detect the presence of signalling framing pattern (F=1011AB). If the signalling framing pattern (F=1011AB) is detected by the F monitor 402, the signalling bits A and B from the input control signal are supplied by the F monitor 402 to a signalling information buffer connected between the F monitor 402 and the DS1 MUX 406. More specifically, signalling bit A is supplied to an A-bit buffer 404 and signalling bit B is supplied to a B-bit buffer 405 for temporary storage until such information bits are required by the DS1 MUX 406 for transmission in the DS1 transmission signal.

DS1 MUX 406 supplies a DS1 SYNC signal to the PCM buffer 403, the A buffer 404, and the B buffer 405 to ensure that the PCM voice byte and the signalling bits A and B are supplied to the DS1 MUX 406 in synchronism with the DS1 signal. The DS1 SYNC signal is also supplied to the DSL DMUX 401 to ensure synchronism of the DSL SYNC signal. The DS1 SYNC signal is supplied at an 8 kbit/s rate.

When the SIGNALLING DISABLE signal is supplied by the F monitor 401 to DS1 MUX 406, the DS1 MUX 406 supplies only the PCM voice communication information byte to the DS1 signal line. When the SIGNALLING DISABLE signal is cleared, the DS1 MUX 406 selectively multiplexes the PCM voice communication information with the signalling information from the input control signal to form the selected DS1 format of the DS1 signal for output to the transmission facility 102. For this purpose, the DS1 MUX 406 includes conventional framing, timing recovery, and other appropriate circuitry for interfacing with, for example, a T-carrier transmission facility.

Figure 6:
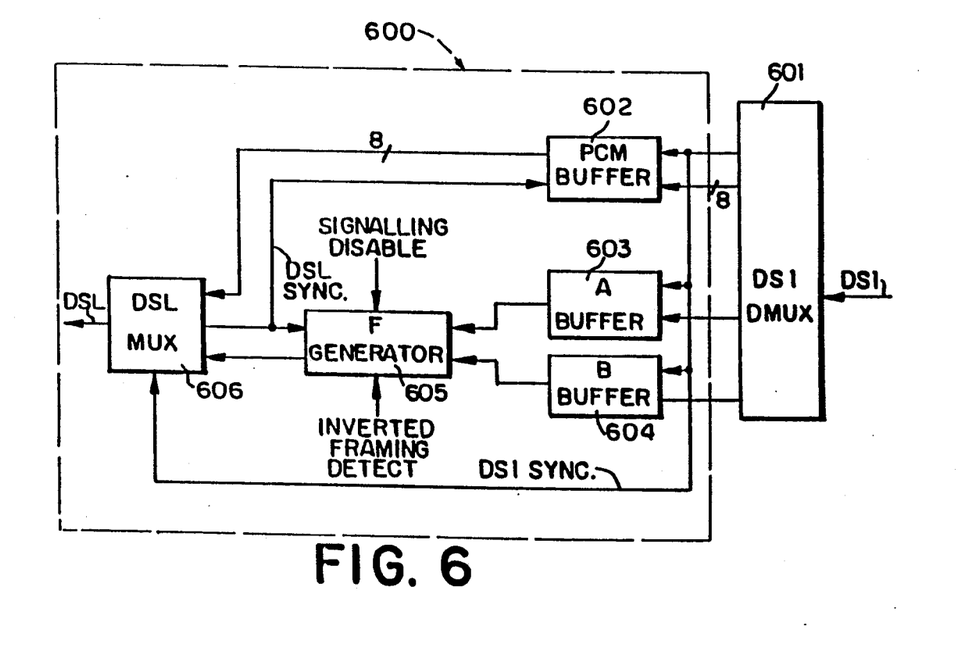
FIG. 6 is a block diagram of receiver circuitry of an office channel unit for use with a DS1 demultiplexer for converting the DS1 signal format into the DSL signal format.

Referring to FIG. 6, the receiver circuitry 600 of the channel units 111 and 113 is depicted. The receiver circuitry 600 of the channel unit cooperates with transmission facility demultiplexer DS1 DMUX 601 to convert the DS1 formatted signal from the transmission facility 102 to a DSL format providing communication information and control information in three specific modes or sequences of framing pattern. As shown in FIG. 6, the transmission facility demultiplexer DS1 DMUX 601 demultiplexes the digital transmission signal from the transmission facility into a communication signal containing communication information from the transmission facility, such as the 8-bit byte of PCM voice communication data, and a signalling signal containing signalling information, such as signalling bits A and B, from the transmission facility. The 8-bit byte of PCM voice communication data is supplied in parallel to a communication information buffer in the form of PCM buffer 602. The PCM buffer 602 is connected between the DS1 DMUX 601 and a digital subscriber line multiplexer DSL MUX 606. The PCM buffer 602 stores the communication information from the transmission facility and provides such communication information to the DSL MUX 606 when required. The signalling information from the transmission facility is supplied by DS1 DMUX 601 to a signalling information buffer connected between DS1 DMUX 601 and an F generator 605. More specifically, signalling bit A is supplied by DS1 DMUX 601 to A-bit buffer 603 while signalling bit B is supplied by DS1 DMUX 601 to B-bit buffer 604 for temporary storage until required by the F generator 605.

DS1 DMUX 601 also supplies a DS1 SYNC signal to the PCM buffer 602, the A buffer 603, the B buffer 604 and the DSL MUX 606 to ensure proper synchronization. The DS1 DMUX 601 includes conventional framing, timing recovery, and other appropriate circuitry for interfacing with the T-carrier transmission facility 102.

The A buffer 603 and the B buffer 604 are each connected to F generator 605 which functions to generate a digital output control signal in three different digital sequences of operation. The F generator 605 is responsive to the SIGNALLING DISABLE signal and the INVERTED FRAMING DETECT signal from the F monitor 402. More specifically, the F generator 605 produces the output control signal in a first digital sequence of standard framing pattern (F=101100) whenever the SIGNALLING DISABLE term is supplied by the F monitor 402. The F generator 605 produces the output control signal in a second digital sequence of inverted framing pattern (F=010011) whenever the INVERTED FRAMING DETECT signal is supplied to the F generator 605 by the F monitor 402. The F generator 605 produces the output control signal in a third digital sequence of signalling framing pattern (F=1011AB) when both the SIGNALLING DISABLE signal and the INVERTED FRAMING DETECT signal are cleared by the F monitor 402.

PCM buffer 602 and F generator 605 are both connected to the DSL MUX 606. DSL MUX 606 generates a DSL SYNC signal in synchronization with the DS1 SYNC signal from DS1 DMUX 601. The DSL SYNC signal is supplied to both the PCM buffer 604 and to the F generator 605 to ensure proper synchronization. The DSL MUX 606 includes conventional framing, timing recovery, and other appropriate circuitry for interfacing with the digital subscriber line DSL.

The 8-bit PCM voice communication information data from PCM buffer 602 is supplied in parallel to DSL MUX 606. The output control signal of the F generator 601 is supplied one bit at a time as framing pattern to the DSL MUX 606. The DSL MUX 606 forms the requisite DSL format for transmission at the 72 kbit/s rate consisting of the standard 56 kbit/s with secondary channel loop operation.

Figure 5:
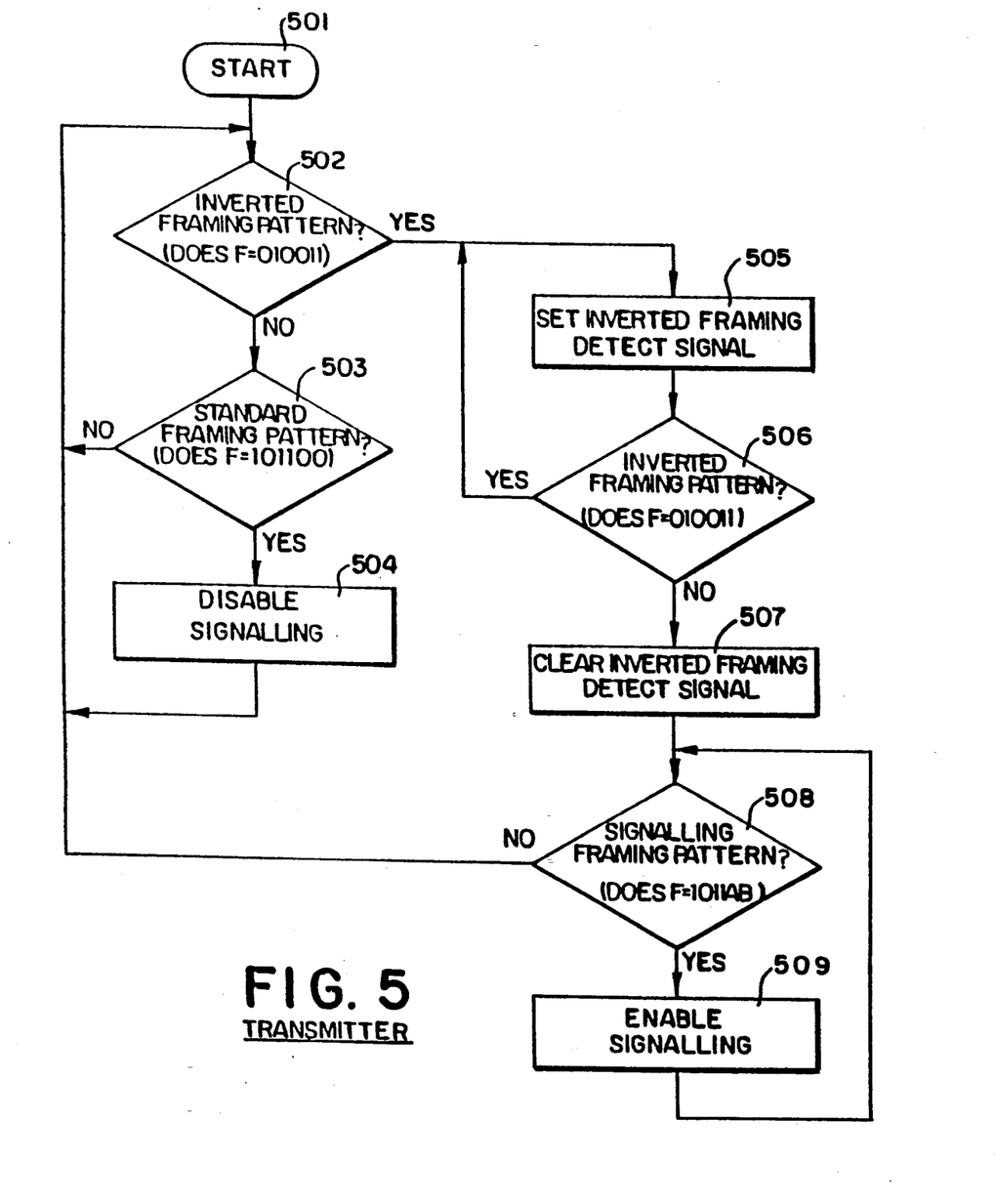
FIG. 5 is a flow chart which illustrates the operation of the transmitter circuitry and DS1 multiplexer depicted in FIG. 4.
Figure 7:
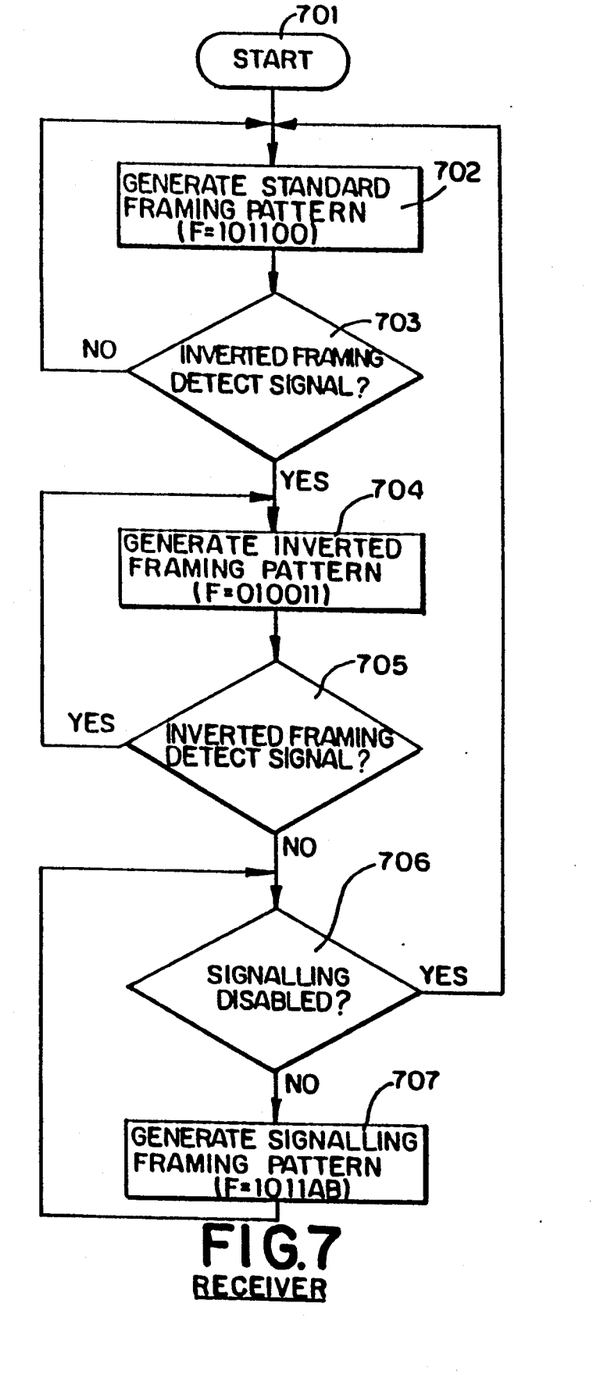
FIG. 7 is a flow chart which illustrates the operation of the receiver circuitry and DS1 demultiplexer depicted in FIG. 6.

Referring to FIGS. 5 and 7, the overall operation of the transmitter and receiver circuitry 400 and 600 in cooperation with DS1 MUX 406 and DS1 DMUX 601 can now be considered. As shown in FIG. 5, the operation of the transmitter circuitry 400 in cooperation with DS1 MUX 406 is started at step 501 to convert a DSL signal format from the customer to a DS1 signal format for the transmission facility. In operation, the F monitor 402 begins to monitor the digital sequence of the input control signal which provides framing pattern from the DSL line. At step 502, the F monitor detects whether the input control signal is in the second sequence of inverted framing pattern from the DSL line (Does F=010011?). If inverted framing pattern is not detected by the F monitor at step 502, the F monitor then functions at step 503 to detect whether the input control signal is in the first sequence of standard framing pattern from the DSL line (Does F=101100?). If standard framing pattern is not detected by the F monitor in step 503, the F monitor repeats back to step 502 to again determine whether inverted framing pattern is present. If, however, standard framing pattern from the DSL line is detected by the F monitor at step 503, the F monitor causes the SIGNALLING DISABLE signal to be produced at step 504. Step 502 is then repeated by the F monitor to again detect whether inverted framing pattern is present.

Once inverted framing pattern is detected by the F monitor at step 502, the F monitor causes the signalling identification detect signal in the form of the INVERTED FRAMING DETECT signal to be produced by the F monitor at step 505. After the INVERTED FRAMING DETECT signal is produced, the F monitor monitors the sequence of the input control signal in step 506 to determine whether inverted framing pattern from the DSL line continues to be present (Does F=010011?). As long as inverted framing pattern is detected by the F monitor at step 506, the F monitor reexecutes step 505 to continue producing the INVERTED FRAMING DETECT signal. When the F monitor no longer detects inverted framing pattern at step 506, the F monitor clears the INVERTED FRAMING DETECT signal in step 507. After clearing the INVERTED FRAMING DETECT signal, the F monitor then functions to monitor the sequence of the input control signal at step 508 to determine whether the input control signal is in the third sequence of signalling framing pattern from the DSL line (Does F=1011AB?). If signalling framing pattern is detected by the F monitor in step 508, the F monitor at step 509 produces a signalling-enablement output by clearing the SIGNALLING DISABLE signal. After enabling signalling, the F monitor repeats step 508 to again determine whether signalling framing pattern from the DSL line continues to be present. As long as signalling framing pattern from the DSL line is detected by the F monitor in step 508, the SIGNALLING DISABLE signal will continue to be cleared in step 509 to enable continued signalling. When signalling framing pattern is not received by the F monitor at step 508, the monitor then repeats back to step 502 to again detect whether inverted framing pattern is present.

Referring to FIG. 6, the operation of the receiver circuitry 600 in cooperation with DS1 DMUX 601 commences at step 701 to convert the DS1 signal format from the transmission facility to the desired DSL format for the DSL line. At step 702, the F generator causes the generation of the output control signal in a first sequence of standard framing pattern (F=101100) for output to the DSL line. At step 703, the F generator interrogates whether the INVERTED FRAMING DETECT signal is being produced by the F monitor 402. If the INVERTED FRAMING DETECT signal is not being produced by the F monitor, the F generator repeats step 702 and continues to produce the output control signal in the first sequence of standard framing pattern. If, however, the INVERTED FRAMING DETECT signal is detected at step 703, the F generator 605 at step 704 produces the output control signal in the second sequence of inverted framing pattern (F=010011) for output to the DSL line. At step 705, the F generator interrogates the status of the INVERTED FRAMING DETECT signal from the F monitor. If the INVERTED FRAMING DETECT signal from the F monitor is still being produced, the F generator continues at step 704 to generate the output control signal in the second sequence of inverted framing pattern. If the INVERTED FRAMING DETECT signal is no longer being produced by the F monitor, the F generator then interrogates the status of the SIGNALLING DISABLE signal at step 706 to ascertain whether signalling has been enabled or disabled. If the SIGNALLING DISABLE signal is being produced by the F monitor, the F generator then proceeds back to step 702 and begins to generate the output control signal in the first sequence of standard framing pattern. If, however, the SIGNALLING DISABLE signal has been cleared by the F monitor at step 706 so as to provide a signalling-enablement output to thereby enable signalling, the F generator, at step 707, generates the output control signal in the third sequence of signalling framing pattern (F=1011AB) for output to the DSL line. The F generator continues to produce the signalling framing pattern for output to the DSL line until the SIGNALLING DISABLE signal reappears. When the SIGNALLING DISABLE signal reappears, the F generator repeats back to step 702 and commences to produce the output control signal with the standard framing pattern (F=101100).

Considering the basic operation of the system, the office channel unit 111 functions to produce only standard framing pattern onto the DSL line if the corresponding customer communication device transmits only standard framing pattern over the DSL line to the channel unit. However, if the customer communication device is capable of sending digital voice signals, such as in PCM format, with associated digital signalling information, the office channel unit will, in response, enable the transmission of such signals to the transmission facility and will also, in response, enable the transmission of PCM voice information together with digital signalling information from the transmission facility back to the customer device. In this regard, the customer communication device will initially identify its capability of receiving voice communication information with associated digital signalling by initially sending to the channel unit over the digital subscriber line DSL an inverted framing pattern (F=010011). The customer communication device will continue to send the inverting framing pattern until the channel unit acknowledges the signalling capability of the customer device by returning an inverted framing pattern signal back to the customer communication device over the digital subscriber line. After this acknowledgment is received, the customer communication device will transmit signalling framing pattern (F=1011AB) to the office channel unit so that signalling bits A and B from the signalling framing pattern can be supplied to the channel unit. Upon detection of the signalling framing pattern, the channel unit will enable the transmission of the signalling framing pattern from the customer communication device to the transmission facility. In addition, the channel unit will also enable the transmission of signalling framing pattern from the transmission facility back to the customer communication device.

In accordance with this process, a highly effective and reliable system for transmitting digital signalling information together with digital voice communication data is provided. The inverted framing pattern (F=010011) and the signalling framing pattern (F=1011AB) used in the system are the same length as the standard framing pattern (F=101100). In addition, the digital sequence of the inverted framing pattern (F=010011) is simply the digital complement of the digital sequence of the standard framing pattern. The inverted framing pattern thereby provides a signalling identification signal which has at least the same digital one density as the standard framing pattern. Likewise, the signalling framing pattern (F=1011AB) used in the system has the same or greater digital one density than the standard framing pattern (F=101100).

From the foregoing description, it can be seen that the present invention provides a reliable method and system for terminating a digital subscriber line for digital voice communication and associated signalling. An effective method and system for interfacing the digital subscriber line with a transmission facility for use in the transmission of digital voice communication data and signalling information is also provided. It should be recognized, however, by those skilled in the art that changes or modifications may be made to the above-described embodiments without departing from the broad inventive concepts of the invention. For example, the system and method can be readily adapted for use in systems employing transmission formats other than the DS1 format. It should be understood, therefore, that the present invention is not limited to the particular embodiments disclosed herein, but is intended to cover all modifications and changes which are within the scope and spirit of the appended claims.

What is claimed is:

1. A system for terminating a digital subscriber line for transmitting digital signals having a selected digital transmission format including communication information and control information comprising:
    a) a demultiplexer for demultiplexing the digital signal from the digital subscriber line into a digital communication signal containing the communication information and a digital input control signal containing the control information, the input control signal selectively having (1) a first digital sequence for a selected non-signalling mode of operation, (2) a second digital sequence for providing signalling identification to indicate signalling capability on the digital subscriber line, and (3) a third digital sequence for providing signalling information from the digital subscriber line;
    b) a monitor for monitoring the sequence of the digital input control signal from the demultiplexer, the monitor selectively producing (1) a signalling identification detect signal when the second digital sequence of the input control signal is detected, and (2) a signalling-enablement output signal when the third digital sequence of the input control signal is detected;
    c) a generator for generating a digital output control signal, the generator being responsive to the signalling-enablement output signal and the signalling identification detect signal from the monitor, the generator selectively producing the digital output control signal (1) in a first digital sequence for a selected non-signalling mode of operation, (2) in a second digital sequence for providing signalling identification to indicate signalling capability on the digital subscriber line when the signalling identification detect signal is produced by the monitor, and (3) in a third digital sequence for providing signalling information for output to the digital subscriber line when the signalling-enablement output signal is produced by the monitor; and
    d) a multiplexer for multiplexing the digital output control signal from the generator and an output digital communication signal into the selected digital transmission format for output onto the digital subscriber line.

2. The system in accordance with claim 1 wherein the first and second digital sequences of the input control signal have the same predetermined length and wherein the second digital sequence of the input control signal has at least the same digital one density within the predetermined length as the first digital sequence of the input control signal.

3. The system in accordance with claim 1 wherein the first and second digital sequences of the output control signal have the same predetermined length and wherein the second digital sequence of the output control signal has at least the same digital one density within the predetermined length as the first digital sequence of the output control signal.

4. The system in accordance with claim 1 wherein the first and third digital sequences of the input control signal have the same predetermined length and wherein the third digital sequence of the input control signal has at least the same digital one density within the predetermined length as the first digital sequence of the input control signal.

5. The system in accordance with claim 1 wherein the first and third digital sequences of the output control signal have the same predetermined length and wherein the third digital sequence of the output control signal has at least the same digital one density within the predetermined length as the first digital sequence of the output control signal.

6. The system in accordance with claim 1 wherein the first digital sequence of the digital output control signal is the same as the first digital sequence of the digital input control signal and wherein the second digital sequence of the digital output control signal is the same as the second digital sequence of the digital input control signal.

7. The system in accordance with claim 1 wherein the second digital sequence of the input control signal is the digital complement of the first digital sequence of the input control signal.

8. The system in accordance with claim 7 wherein the third digital sequence of the input control signal is produced by replacing two bits of information in the first digital sequence of the input control signal with two bits of signalling information from the digital subscriber line.

9. The system in accordance with claim 1 wherein the second digital sequence of the output control signal is the digital complement of the first digital sequence of the output control signal.

10. The system in accordance with claim 9 wherein the third digital sequence of the output control signal is produced by replacing two bits of information in the first digital sequence of the output control signal with two bits of signalling information for output to the digital subscriber line.

11. The system in accordance with claim 1 wherein said monitor produces a signalling disable signal when the first digital sequence of the digital input control signal is detected by the monitor and wherein the monitor clears the signalling disable signal when the third digital sequence of the input control signal is detected by the monitor to provide said signalling-enablement output signal.

12. The system in accordance with claim 11 wherein said monitor clears the signalling identification detect signal when the second digital sequence of the digital input control signal is no longer detected by the monitor.

13. The system in accordance with claim 11 wherein said generator produces the output control signal in the third digital sequence for providing signalling information when the signalling disable signal is cleared by the monitor.

14. The system in accordance with claim 11 wherein said monitor clears the signalling identification detect signal when the second digital sequence of the digital input control signal is no longer detected by the monitor and wherein said generator produces the output control signal in the third digital sequence for providing signalling information when both the signalling disable signal and the signalling identification detect signal are cleared by the monitor.

15. A system for interfacing a digital subscriber line with a digital transmission facility comprising:
   a) a demultiplexer for demultiplexing a digital signal from the digital subscriber line having a selected transmission format including communication information and control information into a digital communication signal containing the communication information and a digital input control signal containing the control information, the input control signal selectively having (1) a first digital sequence for a selected non-signalling mode of operation, (2) a second digital sequence for providing signalling identification to indicate signalling capability on the digital subscriber line, and (3) a third digital sequence for providing signalling information from the digital subscriber line;
   b) a monitor for monitoring the sequence of the input control signal from the demultiplexer, the monitor producing a signalling-enablement output signal when the third digital sequence is detected; and
   c) a multiplexer for selectively multiplexing the communication information from the communication signal from the demultiplexer with the signalling information from the input control signal in a selected format for output to the transmission facility, the multiplexer being responsive to the signalling-enablement output signal to enable output of the signalling information to the transmission facility when the signalling-enablement output signal is produced by the monitor.

16. The system in accordance with claim 15 wherein said monitor produces a signalling disable signal when the first digital sequence of the digital input control signal is detected by the monitor and wherein the monitor clears the signalling disable signal when the third digital sequence of the input control signal is detected by the monitor to provide said signalling-enablement output signal.

17. The system in accordance with claim 16 wherein said multiplexer is responsive to the signalling disable signal to disable output of the signalling information to the transmission facility when the signalling disable signal is produced by the monitor and to enable output of the signalling information to the transmission facility when the signalling disable signal is cleared by the monitor.

18. A system in accordance with claim 15 including:
1) a communication information buffer connected between the demultiplexer and the multiplexer for receiving the communication signal from the demultiplexer to store the communication information and for providing the communication information to the multiplexer; and
2) a signalling information buffer connected with the multiplexer for storing the signalling information from the digital subscriber line and for providing the signalling information from the subscriber line to the multiplexer.

19. The system with claim 18 wherein the signalling information from the digital subscriber line includes at least A-bit information and B-bit information and wherein said signalling information buffer includes an A-bit buffer for the A-bit information and a B-bit buffer for the B-bit information.

20. A system for interfacing a transmission facility with a digital subscriber line for transmitting a digital signal having a selected transmission format including control information comprising:
   a) a demultiplexer for demultiplexing a digital transmission signal from the transmission facility into a communication signal containing communication information and a signalling signal containing signalling information;
   b) a generator receiving the signalling information for producing a digital output control signal selectively having (1) a first digital sequence for a selected non-signalling mode of operation, (2) a second digital sequence for providing signalling identification to indicate signalling capability on the digital subscriber line, and (3) a third digital sequence containing the signalling information, the generator selectively producing the sequences in response to control information from the digital signal from the digital subscriber line; and
   c) a multiplexer for multiplexing the communication information from the communication signal from the demultiplexer with the output control signal from the generator to produce a digital signal having the selected transmission format for output to the digital subscriber line.

21. The system in accordance with claim 20 including: 1) a communication information buffer connected between the demultiplexer and the multiplexer for receiving the communication signal from the demultiplexer to store the communication information and for providing the communication information to the multiplexer; and 2) a signalling information buffer connected between the demultiplexer and the generator for receiving the signalling signal from the demultiplexer to store the signalling information and for providing the signalling information to the generator.

22. The system in accordance with claim 21 wherein the signalling information includes at least A-bit information and B-bit information and wherein said signalling information buffer includes an A-bit buffer for the A-bit information and a B-bit buffer for the B-bit information.

23. A system for interfacing a transmission facility with a digital subscriber line comprising:
   a) a subscriber line demultiplexer for demultiplexing a digital signal from the digital subscriber line into a digital communication signal containing communication information from the subscriber line and a digital input control signal containing control information from the subscriber line, the input control signal selectively having (1) a first digital sequence for a selected non-signalling mode of operation, (2) a second digital sequence for providing signalling identification to indicate signalling capability on the digital subscriber line, and (3) a third digital sequence for providing signalling information from the digital subscriber line;
   b) a monitor for monitoring the sequence of the digital input control signal from the subscriber line demultiplexer, the monitor selectively producing (1) a signalling identification detect signal whenever the second digital sequence of the input control signal is detected, and (2) a signalling-enablement output signal whenever the third digital sequence of the input control signal is detected;
   c) a transmission facility multiplexer for selectively multiplexing the communication information from the digital subscriber line with the signalling information from the input control signal in a selected format for output to the transmission facility, the transmission facility multiplexer being responsive to the signalling-enablement output signal from the monitor to enable the output of the signalling information from the input control signal to the transmission facility when the signalling-enablement output signal is produced by the monitor;
   d) a transmission facility demultiplexer for demultiplexing a digital transmission signal from the transmission facility into a communication signal containing communication information from the transmission facility and a signalling signal containing signalling information from the transmission facility;
   e) a generator for generating a digital output control signal, the generator being responsive to the signalling-enablement output signal and the signalling identification detect signal from the monitor, the generator selectively producing the digital output control signal (1) in a first digital sequence for a selected non-signalling mode of operation, (2) in a second digital sequence for providing signalling identification to indicate signalling capability on the digital subscriber line whenever the signalling identification detect signal is produced by the monitor, and (3) in a third digital sequence including the signalling information from the transmission facility when the signalling-enablement output signal is produced by the monitor; and
   f) a subscriber line multiplexer for multiplexing the communication information from the transmission facility and the digital output control signal from the generator into a digital signal having a selected digital transmission format for output onto the digital subscriber line.

24. The system in accordance with claim 23 wherein the first and second digital sequences of the input control signal have the same predetermined length and wherein the second digital sequence of the input control signal has at least the same digital one density within the predetermined length as the first digital sequence of the input control signal.

25. The system in accordance with claim 23 wherein the first and second digital sequences of the output control signal have the same predetermined length and wherein the second digital sequence of the output control signal has at least the same digital one density within the predetermined length as the first digital sequence of the output control signal.

26. The system in accordance with claim 23 wherein the first and third digital sequences of the input control signal have the same predetermined length and wherein the third digital sequence of the input control signal has at least the same digital one density within the predetermined length as the first digital sequence of the input control signal.

27. The system in accordance with claim 23 wherein the first and third digital sequences of the output control signal have the same predetermined length and wherein the third digital sequence of the output control signal has at least the same digital one density within the predetermined length as the first digital sequence of the output control signal.

28. The system in accordance with claim 23 wherein the first digital sequence of the digital output control signal is the same as the first digital sequence of the digital input control signal and wherein the second digital sequence of the digital output control signal is the same as the second digital sequence of the digital input control signal.

29. The system in accordance with claim 23 wherein the second digital sequence of the input control signal is the digital complement of the first digital sequence of the input control signal.

30. The system in accordance with claim 29 wherein the third digital sequence of the input control signal is produced by replacing two bits of information in the first digital sequence of the input control signal with two bits of signalling information from the digital subscriber line.

31. The system in accordance with claim 23 wherein the second digital sequence of the output control signal is the digital complement of the first digital sequence of the output control signal.

32. The system in accordance with claim 31 wherein the third digital sequence of the output control signal is produced by replacing two bits of information in the first digital sequence of the output control signal with two bits of signalling information from the transmission facility.

33. The system in accordance with claim 23 wherein said monitor produces a signalling disable signal when the first digital sequence of the digital input control signal is detected by the monitor and wherein the monitor clears the signalling disable signal when the third digital sequence of the input control signal is detected by the monitor to provide said signalling-enablement output signal.

34. The system in accordance with claim 33 wherein said monitor clears the signalling identification detect signal when the second digital sequence of the digital input control signal is no longer detected by the monitor.

35. The system in accordance with claim 33 wherein said generator produces the output control signal in the third digital sequence to include the signalling information from the transmission facility when the signalling disable signal is cleared by the monitor.

36. The system in accordance with claim 33 wherein said monitor clears the signalling identification detect signal when the second digital sequence of the digital input control signal is no longer detected by the monitor and wherein said generator produces the output control signal in the third digital sequence to include the signalling information from the transmission facility when both the signalling disable signal and the signalling identification detect signal are cleared by the monitor.

37. The system in accordance with claim 33 wherein said transmission facility multiplexer is responsive to the signalling disable signal to disable output of the signalling information from the input control signal to the transmission facility when the signalling disable signal is produced by the monitor and to enable output of the signalling information from the input control signal to the transmission facility when the signalling disable signal is cleared by the monitor.

38. The system in accordance with claim 23 including: 1) a communication information buffer connected between the subscriber line demultiplexer and the transmission facility multiplexer for receiving the communication signal from the subscriber line demultiplexer to store the communication information from the digital subscriber line and for providing the communication information from the digital subscriber line to the transmission facility multiplexer; and 2) a signalling information buffer connected with the transmission facility multiplexer for storing the signalling information from the digital subscriber line and for providing the signalling information from the digital subscriber line to the transmission facility multiplexer.

39. The system in accordance with claim 38 wherein the signalling information from the digital subscriber line includes at least A-bit information and B-bit information and said signalling information buffer includes an A-bit buffer for the A-bit information and a B-bit buffer for the B-bit information.

40. The system in accordance with claim 23 including: 1) a communication information buffer connected between the transmission facility demultiplexer and the subscriber line multiplexer for receiving the communication signal from the transmission facility demultiplexer to store the communication information from the transmission facility and for providing the communication information from the transmission facility to the subscriber line multiplexer; and 2) a signalling information buffer connected between the transmission facility demultiplexer and the generator for receiving the signalling signal from the transmission facility demultiplexer to store the signalling information from the transmission facility and for providing the signalling information from the transmission facility to the generator.

41. The system in accordance with claim 40 wherein the signalling information from the transmission facility includes at least A-bit information and B-bit information and wherein said signalling information buffer includes an A-bit buffer for the A-bit information and a B-bit buffer for the B-bit information.

42. A method for terminating a digital subscriber line which transmits digital signals having a selected digital transmission format including communication information and control information comprising;
   a) demultiplexing the digital signal from the digital subscriber line into a digital communication signal containing the communication information and a digital input control signal containing the control information, the input control signal selectively having 1) a first digital sequence for a selected non-signalling mode of operation, 2) a second digital sequence for providing signalling identification to indicate signalling capability on the digital subscriber line, and 3) a third digital sequence for providing signalling information from the digital subscriber line;
   b) monitoring the digital input control signal to detect the sequence of the digital input control signal;
   c) producing a signalling identification detect signal when the second digital sequence of the input control signal is detected;
   d) producing a signalling-enablement output signal when the third digital sequence of the input control signal is detected;
   e) producing a digital output control signal in a first digital sequence for a selected non-signalling mode of operation;
   f) producing the digital output control signal in a second digital sequence for providing signalling identification to indicate signalling capability on the digital subscriber line when the signalling identification detect signal is produced;
   g) producing the digital output control signal in a third digital sequence for providing signalling information for output to the digital subscriber line when the signalling-enablement output signal is produced; and
   h) multiplexing the digital output control signal being produced with an output digital communication signal into the selected digital transmission format for output onto the digital subscriber line.

43. The method in accordance with claim 42 wherein the first and second digital sequences of the input control signal are produced to have the same predetermined length and wherein the second digital sequence of the input control signal is produced to have at least the same digital one density within the predetermined length as the first digital sequence of the input control signal.

44. The method in accordance with claim 42 wherein the first and second digital sequences of the output control signal are produced to have the same predetermined length and wherein the second digital sequence of the output control signal is produced to have at least the same digital one density within the predetermined length as the first digital sequence of the output control signal.

45. The method in accordance with claim 42 wherein the first and third digital sequences of the input control signal are produced to have the same predetermined length and wherein the third digital sequence of the input control signal is produced to have at least the same digital one density within the predetermined length as the first digital sequence of the input control signal.

46. The method in accordance with claim 42 wherein the first and third digital sequences of the output control signal are produced to have the same predetermined length and wherein the third digital sequence of the output control signal is produced to have at least the same digital one density within the predetermined length as the first digital sequence of the output control signal.

47. The method in accordance with claim 42 wherein the first digital sequence of the digital output control signal is produced to be the same as the first digital sequence of the digital input control signal and wherein the second digital sequence of the digital output control signal is produced to be the same as the second digital sequence of the digital input control signal.

48. The method in accordance with claim 42 wherein the second digital sequence of the input control signal is produced as the digital complement of the first digital sequence of the input control signal.

49. The method in accordance with claim 48 wherein the third digital sequence of the input control signal is produced by replacing two bits of information in the first digital sequence of the input control signal with two bits of signalling information from the digital subscriber line.

50. The method in accordance with claim 42 wherein the second digital sequence of the output control signal is produced as the digital complement of the first digital sequence of the output control signal.

51. The method in accordance with claim 50 wherein the third digital sequence of the output control signal is produced by replacing two bits of information in the first digital sequence of the output control signal with two bits of signalling information for output to the digital subscriber line.

52. The method in accordance with claim 42 wherein the step of producing the signalling-enablement output signal includes the steps of:
    a) producing a signalling disable signal when the first digital sequence of the digital input control signal is detected; and
    b) clearing the signalling disable signal when the third digital sequence of the input control signal is detected to provide the signalling-enablement output signal.

53. The method in accordance with claim 52 comprising the steps of:
    a) clearing the signalling identification detect signal when the second digital sequence of the digital input control signal is no longer detected; and
    b) producing the output control signal in the third digital sequence for providing signalling information when both the signalling disable signal and the signalling identification detect signal are cleared.

54. A method for interfacing a digital subscriber line with a digital transmission facility comprising:
    a) demultiplexing a digital signal from the digital subscriber line having a selected transmission format including communication information and control information into a digital communication signal containing the communication information and a digital input control signal containing the control information, the input control signal selectively having 1) a first digital sequence for a selected non-signalling mode of operation, 2) a second digital sequence for providing signalling identification to indicate signalling capability on the digital subscriber line, and 3) a third digital sequence for providing signalling information from the digital subscriber line;
    b) monitoring the input control signal to detect the sequence of the input control signal;
    c) producing a signalling-enablement output signal when the third digital sequence is detected;
    d) selectively multiplexing the communication information from the communication signal with the signalling information from the input control signal in a selected format for output to the transmission facility; and
    e) enabling the output of the signalling information to the transmission facility when the signalling-enablement output signal comprises:

55. The method in accordance with claim 54 wherein the step of producing the signalling-enablement output signal comprises:
    a) producing a signalling disable signal when the first digital sequence of the digital input control signal is detected; and
    b) clearing the signalling disable signal when the third digital sequence of the input control signal is detected to provide the signalling-enablement output signal.

56. A method for interfacing a transmission facility with a digital subscriber line which transmits a digital signal having a selected transmission format including control information comprising:
    a) demultiplexing a digital transmission signal from the transmission facility into a communication signal containing communication information and a signalling signal containing signalling information;
    b) selectively producing a digital output control signal having 1) a first digital sequence for a selected non-signalling mode of operation, 2) a second digital sequence for signalling identification to indicate signalling capability on the digital subscriber line, and 3) a third digital sequence containing the signalling information;
    c) selectively producing the first, second, and third digital sequences in response to control information from the digital signal from the digital subscriber line; and
    d) multiplexing the communication information from the communication signal with the output control signal to produce a digital signal having the selected transmission format for output to the digital subscriber line.

57. A method for interfacing a transmission facility with a digital subscriber line comprising:
    a) demultiplexing a digital signal from the digital subscriber line into a digital communication signal containing communication information from the subscriber line and a digital input control signal containing control information from the subscriber line, the input control signal selectively having: 1) a first digital sequence for a selected non-signalling mode of operation, 2) a second digital sequence for providing signalling identification to indicate signalling capability on the digital subscriber line, and 3) a third digital sequence for providing signalling information from the digital subscriber line;
    b) monitoring the digital input control signal to detect the sequence of the digital input control signal;
    c) producing a signalling identification detect signal whenever the second digital sequence of the input control signal is detected;
    d) producing a signalling-enablement output signal whenever the third digital sequence of the input control signal is detected;

e) multiplexing the communication information from the subscriber line with the signalling information from the input control signal in a selected format for output to the transmission facility;

f) enabling the output of the signalling information from the input control signal to the transmission facility when the signalling enablement output signal is produced;

g) demultiplexing a digital transmission signal from the transmission facility into a communication signal containing communication information from the transmission facility and a signalling signal containing signalling information from the transmission facility;

h) producing a digital output control signal in a first digital sequence for a selected non-signalling mode of operation;

i) producing the digital output control signal in a second digital sequence for providing signalling identification to indicate signalling capability on the digital subscriber line whenever the signalling identification detect signal is produced;

j) producing the digital output control signal in a third digital sequence to include the signalling information from the transmission facility when the signalling-enablement output signal is produced; and k) multiplexing the communication information from the transmission facility and the digital output control signal into a digital signal having a selected digital transmission format for output onto the digital subscriber line.

58. The method in accordance with claim 57 wherein the first and second digital sequences of the input control signal are produced to have the same predetermined length and wherein the second digital sequence of the input control signal is produced to have at least the same digital one density within the predetermined length as the first sequence of the input control signal.

59. The method in accordance with claim 57 wherein the first and second digital sequences of the output control signal are produced to have the same predetermined length and wherein the second digital sequence of the output control signal is produced to have at least the same digital one density within the predetermined length as the first digital sequence of the output control signal.

60. The method in accordance with claim 57 wherein the first and third digital sequences of the input control signal are produced to have the same predetermined length and wherein the third digital sequence of the input control signal is produced to have at least the same digital one density within the predetermined length as the first digital sequence of the input control signal.

61. The method in accordance with claim 57 wherein the first and third digital sequences of the output control signal are produced to have the same predetermined length and wherein the third digital sequence of the output control signal is produced to have at least the same digital one density within the predetermined length as the first digital sequence of the output control signal.

62. The method in accordance with claim 57 wherein the first digital sequence of the digital output control signal is produced to be the same as the first digital sequence of the digital input control signal and wherein the second digital sequence of the digital output control signal is produced to be the same as the second digital sequence of the digital input control signal.

63. The method in accordance with claim 57 wherein the second digital sequence of the input control signal is produced to be the digital complement of the first digital sequence of the input control signal.

64. The system in accordance with claim 63 wherein the third digital sequence of the input control signal is produced by replacing two bits of information in the first digital sequence of the input control signal with two bits of signalling information from the digital subscriber line.

65. The method in accordance with claim 57 wherein the second digital sequence of the output control signal is produced to be the digital complement of the first digital sequence of the output control signal.

66. The system in accordance with claim 65 wherein the third digital sequence of the output control signal is produced by replacing two bits of information in the first digital sequence of the output control signal with two bits of signalling information from the transmission facility.

67. The method in accordance with claim 57 wherein the step of producing said signaling-enablement output signal comprises:

a) producing a signalling disable signal when the first digital sequence of the digital input control signal is detected; and b) clearing the signalling disable signal when the third digital sequence of the input control signal is detected to provide said signalling-enablement output signal.

68. The method in accordance with claim 67 comprising the steps of: a) clearing the signalling identification detect signal when the second digital sequence of the digital input control signal is no longer detected; and b) producing the output control signal in the third digital sequence to include the signalling information from the transmission facility when both the signalling disable signal and the signalling identification detect signal are cleared.

* * * * *